United States Patent
Tajima

(10) Patent No.: US 8,970,754 B2
(45) Date of Patent: Mar. 3, 2015

(54) IMAGE CAPTURING APPARATUS AND METHOD FOR CONTROLLING THE IMAGE CAPTURING APPARATUS

(75) Inventor: Kaori Tajima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 13/529,496

(22) Filed: Jun. 21, 2012

(65) Prior Publication Data

US 2013/0002919 A1     Jan. 3, 2013

(30) Foreign Application Priority Data

Jul. 1, 2011   (JP) ................. 2011-147738

(51) Int. Cl.
*H04N 3/14* (2006.01)
*H04N 5/335* (2011.01)
*G03B 13/00* (2006.01)
*H04N 5/232* (2006.01)
*H04N 5/353* (2011.01)
*H04N 5/3745* (2011.01)
*H04N 5/378* (2011.01)
*H04N 5/235* (2006.01)
*H04N 5/347* (2011.01)

(52) U.S. Cl.
CPC ........... *H04N 5/23212* (2013.01); *H04N 5/353* (2013.01); *H04N 5/3745* (2013.01); *H04N 5/378* (2013.01); *H04N 5/235* (2013.01); *H04N 5/347* (2013.01)
USPC ............................. 348/296; 348/308; 348/349

(58) Field of Classification Search
None
See application file for complete search history.

(56) References Cited

U.S. PATENT DOCUMENTS

| | | | |
|---|---|---|---|
| 2002/0036257 A1* | 3/2002 | Yamashita et al. | 250/208.1 |
| 2002/0121652 A1* | 9/2002 | Yamasaki | 348/302 |
| 2004/0096124 A1* | 5/2004 | Nakamura | 348/308 |
| 2007/0063127 A1* | 3/2007 | Bock | 250/208.1 |
| 2007/0257185 A1* | 11/2007 | Asaba | 250/208.1 |
| 2009/0002528 A1* | 1/2009 | Manabe et al. | 348/248 |
| 2010/0091161 A1* | 4/2010 | Suzuki | 348/302 |

FOREIGN PATENT DOCUMENTS

| | | |
|---|---|---|
| CN | 101365069 A | 2/2009 |
| JP | 02-241281 | 9/1990 |
| JP | 2000-305010 A | 11/2000 |
| JP | 2006-135479 | 5/2006 |
| JP | 2007-281296 A | 10/2007 |
| JP | 2011-128536 A | 6/2011 |

OTHER PUBLICATIONS

Japanese Office Action, that issued in Japanese Patent Application No. 2011-147738.

Chinese Office Action, that issued in Chinese Patent Application No. 201210228045.5.

* cited by examiner

*Primary Examiner* — Jason Flohre
(74) *Attorney, Agent, or Firm* — Cowan, Liebowitz & Latman, P.C.

(57) ABSTRACT

An image capturing apparatus comprises an image sensor that includes a plurality of pixels each having a plurality of photoelectric conversion units and a microlens and that is capable of capturing a subject and periodically outputting image signals individually from the plurality of photoelectric conversion units, a control unit that performs control such that, within the period in which the image sensor outputs an image signal, charge accumulation durations of the plurality of photoelectric conversion units of each pixel of the image sensor are shifted with respect to each other, and a synthesizing unit that sums up, for each pixel, the image signals individually output from the plurality of photoelectric conversion units.

8 Claims, 8 Drawing Sheets

IMAGE CAPTURING APPARATUS AND METHOD FOR CONTROLLING THE IMAGE CAPTURING APPARATUS

BACKGROUND OF THE INVENTION

1. Field of the Invention

The present invention relates to an image capturing apparatus and a method for controlling the image capturing apparatus, and more particularly to an image capturing apparatus including an image sensor in which pixels each including a plurality of divided photoelectric conversion units are two-dimensionally arranged, and a method for controlling the same.

2. Description of the Related Art

Conventional image capturing apparatuses perform automatic exposure control based on, for example, a control line diagram as shown in FIG. 9. In FIG. 9, Open, F4 and F8 indicate the aperture size of the diaphragm. Open is the maximum aperture size of the diaphragm, and the aperture size of the diaphragm becomes smaller as the value of F number increases. Also, 1/60, 1/500 and 1/2000 indicate shutter speed, and the charge accumulation duration becomes shorter as the value decreases. In FIG. 9, when the luminance of the subject is high, the amount of light entering the sensor is suppressed by increasing the shutter speed to shorten the charge accumulation duration and/or by reducing the aperture.

With the recent trend toward smaller image sensors, small aperture blur due to diffraction is becoming more prominent, and thus there is a need to adjust exposure control on the high luminance side by control of the charge accumulation duration if possible. However, in the case where an image signal is periodically output when capturing moving images, as shown in FIG. 10, in each period tf, if the charge accumulation duration to of each pixel is short, the duration tb during which accumulation is not performed will be long. Accordingly, motion resolution decreases particularly when a moving subject is captured. As used herein, motion resolution means the smoothness of changes in moving images. For example, if the motion resolution decreases, the smoothness of subject motion in moving images decreases, resulting in the motion of the subject appearing like individual frames.

To address this, according to a conventional technique disclosed in Japanese Patent Laid-Open No. 02-241281, when a subject with high luminance is captured, short accumulation is performed, thereafter long accumulation is performed by adjusting a liquid crystal (LCD) shutter, and a signal obtained by short accumulation and a signal obtained by long accumulation are synthesized, so as to not have a non-accumulation duration.

Also, Japanese Patent Laid-Open No. 2006-135479 discloses a technique in which a decrease in motion resolution when capturing a subject with high luminance is reduced by, when the luminance of the subject becomes high, controlling exposure with an ND filter and then controlling the shutter speed.

With the conventional technique disclosed in Japanese Patent Laid-Open No. 02-241281, however, there is a difference in the amount of motion blur during the accumulation duration between the signal read out through short accumulation and the signal read out through long accumulation, and as a result, the synthesized image may be seen as two images.

The conventional technique disclosed in Japanese Patent Laid-Open No. 2006-135479 is also problematic in that it requires the ND filter, which increases the manufacturing cost of the image capturing apparatus as well as increasing the size of the image capturing apparatus.

SUMMARY OF THE INVENTION

The present invention has been made in consideration of the above situation, and enables reduction of a decrease in motion resolution due to the charge accumulation duration being short at the time of exposure control with the charge accumulation duration when a subject with high luminance is captured.

According to the present invention, provided is an image capturing apparatus comprising: an image sensor that includes a plurality of pixels each having a plurality of photoelectric conversion units and a microlens and that is capable of capturing a subject and periodically outputting image signals individually from the plurality of photoelectric conversion units; a control unit that performs control such that, within the period in which the image sensor outputs an image signal, charge accumulation durations of the plurality of photoelectric conversion units of each pixel of the image sensor are shifted with respect to each other; and a synthesizing unit that sums up, for each pixel, the image signals individually output from the plurality of photoelectric conversion units.

According to the present invention, provided is a method for controlling an image capturing apparatus including an image sensor that includes a plurality of pixels each having a plurality of photoelectric conversion units and a microlens and that is capable of capturing a subject and periodically outputting image signals individually from the plurality of photoelectric conversion units, the method comprising: with a control unit, performing control such that, within the period in which the image sensor outputs an image signal, charge accumulation durations of the plurality of photoelectric conversion units of each pixel of the image sensor are shifted with respect to each other; and with a synthesizing unit, summing up, for each pixel, the image signals individually output from the plurality of photoelectric conversion units.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

First Embodiment

Figure 1:
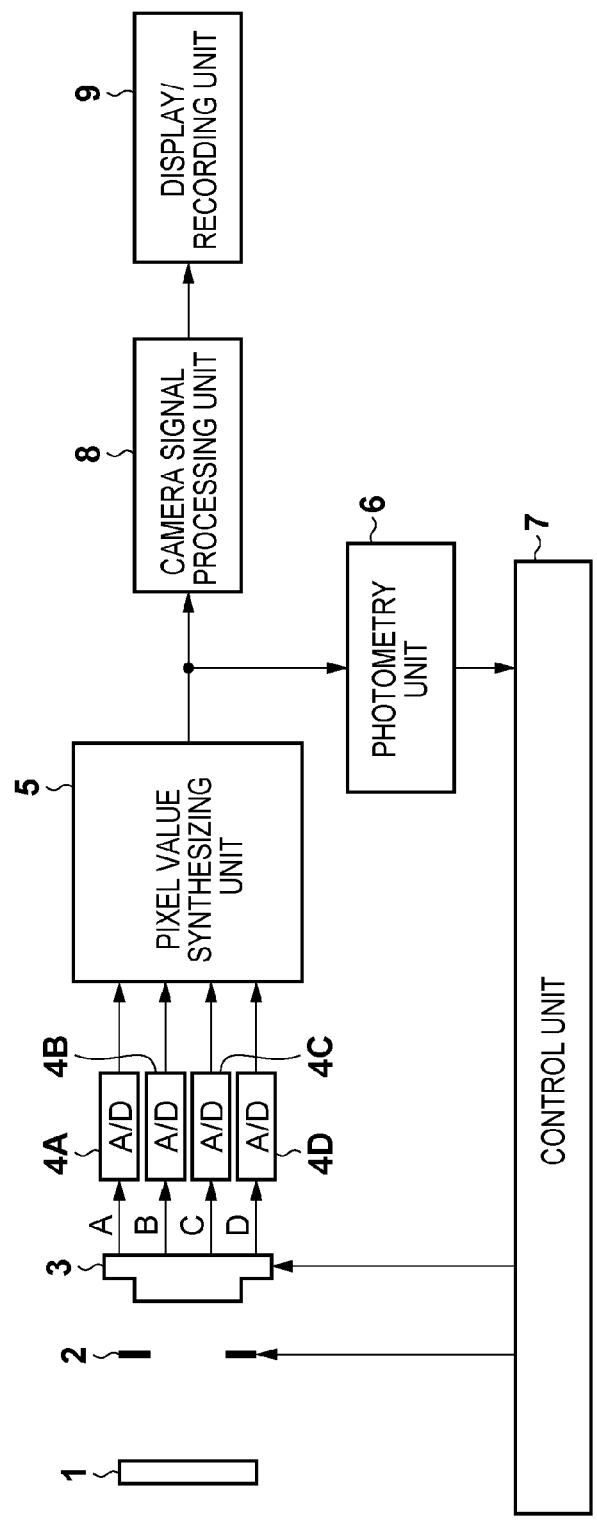
FIG. 1 is a block diagram showing a schematic configuration of an image capturing apparatus according to a first embodiment of the present invention.

FIG. 1 is a block diagram showing a schematic configuration of an image capturing apparatus according to a first embodiment of the present invention. In FIG. 1, reference numeral 1 indicates an imaging lens, reference numeral 2 indicates a diaphragm, reference numeral 3 indicates an image sensor, reference numerals 4A to 4D indicates A/D converters, and reference numeral 5 indicates a pixel value synthesizing unit that synthesizes digital signals output from the A/D converters 4A to 4D and generates a signal corresponding to a single pixel. Reference numeral 6 indicates a photometry unit for exposure control, reference numeral 7 indicates a control unit that performs overall control of the image capturing apparatus, reference numeral 8 indicates a camera signal processing unit that performs camera signal processing on the output signal from the pixel value synthesizing unit 5, and reference numeral 9 indicates a display/recording unit.

Figure 2:
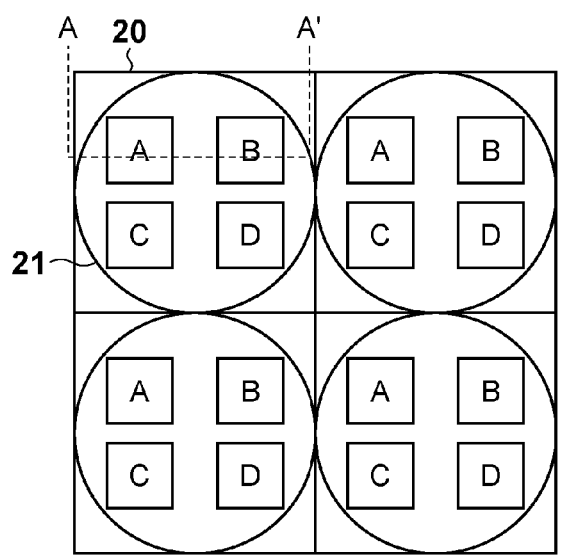
FIG. 2 is a plan view showing a schematic configuration of some of the pixels of an image sensor according to the first embodiment.

FIG. 2 is a plan view showing a schematic configuration of 2×2 pixels out of a plurality of pixels constituting the image sensor 3 of the first embodiment. The image sensor 3 includes a plurality of photoelectric conversion units within a single pixel. Reference numeral 20 indicates a region representing one pixel. Reference numeral 21 indicates a microlens. Reference signs A, B, C and D indicate photoelectric conversion units. In FIG. 2, elements other than the microlenses and the photoelectric conversion units are not illustrated. Also, reference signs A, B, C and D attached to signal lines in FIG. 1 correspond to the photoelectric conversion units A, B, C and D, respectively.

The image sensor 3 of the first embodiment has a feature in which charge accumulation and charge read-out can be individually controlled in each of the photoelectric conversion units A, B, C and D of a single pixel. By using such a feature of the image sensor 3, the first embodiment realizes an image capture operation that does not decrease motion resolution in the manner described below even when the charge accumulation duration has to be shortened to control exposure.

Operations performed by the image capturing apparatus of the first embodiment will be described next. Light that has entered the image sensor 3 via the imaging lens 1 and the diaphragm 2 is converted to electric charges by the photoelectric conversion units A, B, C and D of the image sensor 3, and charge accumulation and read-out control are performed by each of the photoelectric conversion units. Then, analog signals read out from the respective photoelectric conversion units A, B, C and D of the image sensor 3 are output to the A/D converters 4A to 4D and converted to digital signals.

After that, the digital signals obtained as a result of conversion by the A/D converters 4A to 4D are summed up for each pixel by the pixel value synthesizing unit 5, and the pixel value of a single pixel is output. The output signals of the pixel value synthesizing unit 5 are sequentially input into the camera signal processing unit 8, where processing is performed such as luminance, color difference signal generation, contour compensation and gamma processing. The output of the camera signal processing unit 8 is displayed on and recorded in a display panel and storage medium (not shown) provided in the main body via the display/recording unit 9.

The signals output from the pixel value synthesizing unit 5 are also input into the photometry unit 6, and the photometry unit 6 analyzes the signal level of the captured image, and sends the result of analysis to the control unit 7. The control unit 7 controls the diaphragm 2 and the image sensor 3 based on the result from the photometry unit 6, and performs exposure adjustment so as to attain an appropriate amount of light entering the image sensor 3.

Figure 3:
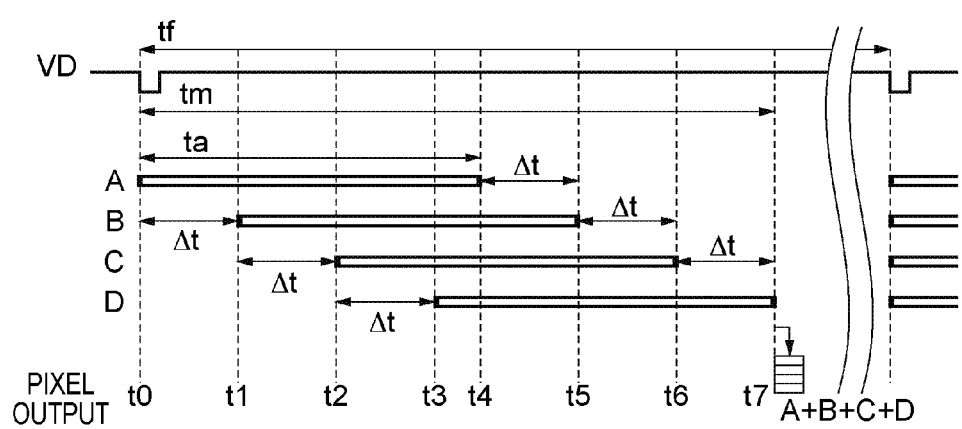
FIG. 3 is a timing chart showing timings for driving the image sensor in the case where the driving timings of a plurality of photoelectric conversion units of each pixel are shifted according to the first embodiment.

Next is a description of a method for reducing a decrease in motion resolution (frame-by-frame feel of moving images) when image capturing with a high-speed shutter while realizing a pseudo long accumulation time without changing exposure level by drive control by the image sensor 3 and pixel value synthesizing processing by the pixel value synthesizing unit 5, with reference to FIG. 3.

In FIG. 3, the duration from a falling edge to the next falling edge of VD is the duration for a single frame of moving images, and is defined to be tf seconds. The image sensor 3 is capable of periodically outputting image signals for each frame duration when capturing moving images. Also, A, B, C and D respectively indicate the accumulation durations of the photoelectric conversion units A, B, C and D of each pixel of the image sensor 3. The charge accumulation duration (ta seconds) of the photoelectric conversion units A, B, C and D is the time calculated by the control unit 7 to attain an appropriate exposure. In the image capturing apparatus of the first embodiment, as shown in FIG. 2, the outputs of four photoelectric conversion units A, B, C and D that share a microlens are summed up to generate the signal of a single pixel. Accordingly, if the signal level of one of the photoelectric conversion units A, B, C and D obtained by accumulation for ta seconds is assumed to be L/4, a signal level L is obtained as the signal level of a single pixel.

If the charge accumulation duration (ta seconds) calculated by the control unit 7 to attain an appropriate exposure is shorter than the frame duration (tf seconds) for a single frame of moving images, accumulation is performed sequentially by shifting the accumulation start time and read-out start time of each of the photoelectric conversion units A, B, C and D of a single pixel by a predetermined length of time. Also, driving timings are controlled such that the charge accumulation durations of the photoelectric conversion units A, B, C and D of a single pixel are the same length. The read-out start time can be controlled by resetting the electric charges accumulated in the photoelectric conversion unit. Accordingly, in each frame duration (period), the charge accumulation duration ta is the duration from the time at which the electric charges of one of the photoelectric conversion units A, B, C and D are reset to the time at which the accumulated electric charges are read out.

Specifically, as shown in FIG. 3, the photoelectric conversion unit A of each pixel starts accumulation at t0, which is the same time as the falling edge of VD, performs charge accumulation for ta seconds, and starts read-out at t4. The photoelectric conversion unit B starts accumulation at t1, which is the time delayed by Δt seconds from the accumulation start time t0 of the photoelectric conversion unit A, performs charge accumulation for ta seconds, and starts read-out at t5. The time t5 is a time delayed by Δt seconds from the read-out start time t4 of the photoelectric conversion unit A. Similarly, the photoelectric conversion unit C starts accumulation at t2, which is a time delayed by Δt seconds from the accumulation start time Δt of the photoelectric conversion unit B, performs charge accumulation for ta seconds, and starts read-out at t6. The time t6 is a time delayed by Δt seconds from the read-out start time t5 of the photoelectric conversion unit B. The photoelectric conversion unit D starts accumulation at t3, which is a time delayed by Δt seconds from the accumulation start time t2 of the photoelectric conversion unit C, performs charge accumulation for ta seconds, and starts read-out at t7. The time t7 is a time delayed by Δt seconds from the read-out start time t6 of the photoelectric conversion unit C.

By controlling charge accumulation in this way, although the charge accumulation duration of each of the photoelectric conversion units A, B, C and D of each pixel is ta seconds, the duration from the accumulation start time t0 of the photoelectric conversion unit A to the read-out start time t7 of the photoelectric conversion unit D is tm seconds (ta<tm).

Obtaining the signal of a single pixel by summing up signals sequentially read from the photoelectric conversion units A, B, C and D of a pixel by performing drive control in the manner described above can be regarded as the same as obtaining a signal level that can be obtained by accumulation for ta seconds by taking longer (tm seconds) than ta seconds.

In other words, in the case where the charge accumulation duration set so as to obtain an appropriate exposure is shorter than the frame duration for a single frame of moving images and there is a concern that the motion resolution might decrease, the desired exposure level can be obtained in an apparently longer charge accumulation duration than the set charge accumulation duration. Accordingly, it is possible to prevent motion resolution from decreasing.

Figure 4A:
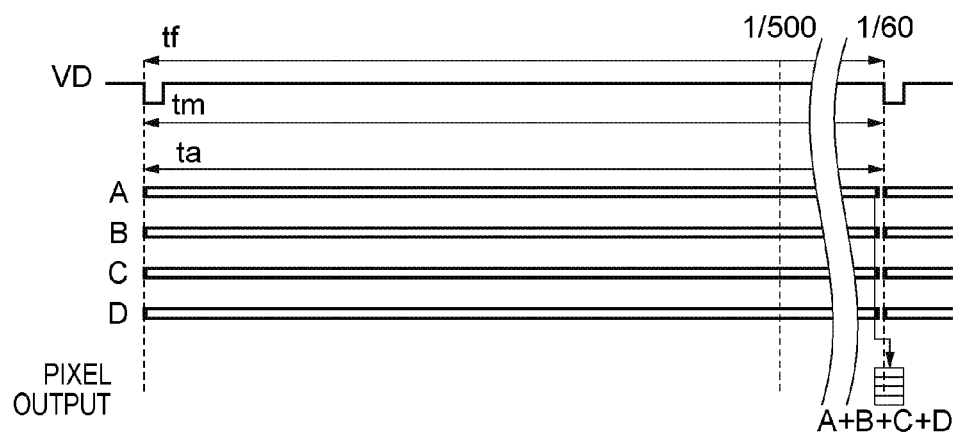
FIGS. 4A and 4B are timing charts showing timings for driving the image sensor in the case where the driving timings of a plurality of photoelectric conversion units of each pixel are the same according to the first embodiment.

An example of exposure control according to subject luminance performed in the image capturing apparatus of the first embodiment will be described next with reference to the control line diagram of FIG. 5 and the driving timing charts of FIG. 3 and FIGS. 4A and 4B.

In the image capturing apparatus of the first embodiment, exposure is controlled by a combination of the aperture value of the diaphragm 2 and the charge accumulation duration in the image sensor 3. In the example shown below, it is assumed that the frame duration tf for a single frame of moving images is 1/60 seconds, the charge accumulation duration that is the acceptable limit for motion resolution decrease is 1/500 seconds, and with respect to the aperture, if F number exceeds F4, the resolution decreases by small aperture blur due to diffraction.

Figure 5:
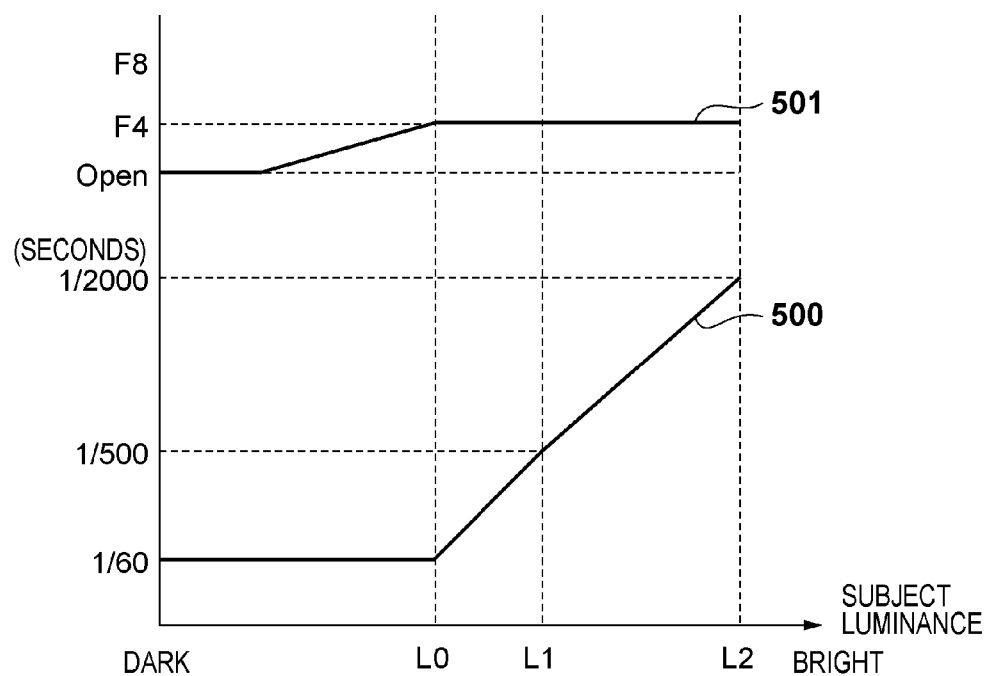
FIG. 5 is a programmed locus illustrating exposure control according to subject luminance according to the first embodiment.

In FIG. 5, reference numeral 500 indicates control characteristics of charge accumulation duration with respect to subject luminance, and reference numeral 501 indicates control characteristics of aperture with respect to subject luminance.

In FIG. 5, the aperture is controlled in a range from open to F4 according to the subject luminance while the charge accumulation duration is fixed to 1/60 seconds until a subject luminance of L0, whereby the amount of light entering the image sensor is adjusted. FIG. 4A shows driving timings in the image sensor 3 in this case. In FIG. 4A, in the photoelectric conversion units A, B, C and D of a single pixel, the accumulation start timings and read-out start timings of the photoelectric conversion units are set to be the same, and driving is controlled such that the charge accumulation duration to is 1/60 seconds in each photoelectric conversion unit.

Next, if the subject luminance exceeds L0, in order to avoid small aperture blur, the charge accumulation duration is controlled while the aperture is fixed to F4, and thereby the amount of light entering the image sensor 3 is adjusted.

Figure 4B:
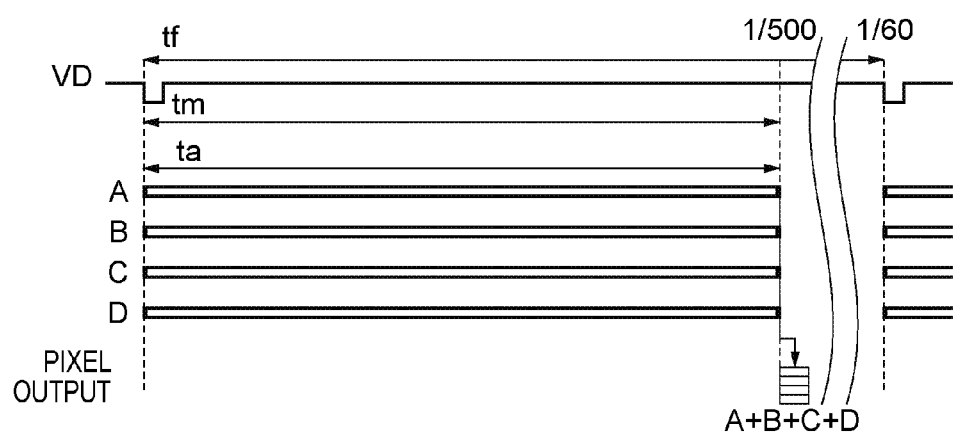

FIG. 4B shows driving timings in the image sensor 3 when the subject luminance is from L0 to L1, or in other words, when the charge accumulation duration SS satisfies 1/60 (seconds)>SS≤1/500 (seconds). In FIG. 4B as well, the charge accumulation start timing and read-out start timing are set to be the same among the photoelectric conversion units A, B, C and D of a single pixel, and driving is controlled such that the charge accumulation duration to is determined to attain an appropriate exposure. When the subject luminance falls in a range from L0 to L1, the charge accumulation duration for obtaining an appropriate exposure is shorter than the frame duration tf for a single frame of output images. Accordingly, as shown in FIG. 4B, within the frame duration tf for a single frame, a duration during which accumulation is not performed occurs, but here, it causes no problem because the decease in motion resolution is acceptable as long as the charge accumulation duration is up to about 1/500 seconds in the frame duration having a length of 1/60 seconds.

Also, when the subject luminance falls in a range from L1 to L2, the charge accumulation duration SS that has been set in order to obtain an appropriate exposure satisfies 1/500 (seconds)>SS>1/2000 (seconds), as a result of which image capturing is performed using a charge accumulation duration with which the decrease in motion resolution is not acceptable.

To address this, the charge accumulation start timing and read-out start timing of the photoelectric conversion units A, B, C and D of each pixel are controlled in the manner described above with reference to FIG. 3. In other words, driving of the image sensor 3 is controlled such that the charge accumulation duration is determined to obtain an appropriate exposure by shifting the charge accumulation duration of each of the photoelectric conversion units A, B, C and D by Δt seconds within the frame duration (within the period) while maintaining the charge accumulation duration ta. Here, Δt is calculated by the control unit 7, using the number n of photoelectric conversion units included in a single pixel, the charge accumulation duration ta determined by the control unit 7 in order to obtain an appropriate exposure, and the charge accumulation duration tm with which the decrease in motion resolution is acceptable. The calculation formula is as given in the following formula (1).

$$\Delta t = (tm - ta)/(n-1) \tag{1}$$

By obtaining the signal of each pixel by summing up the signals sequentially read out from the photoelectric conversion units A, B, C and D through the above-described drive control, even when a short charge accumulation duration with which the decrease in motion resolution is not acceptable is set, the charge accumulation duration can appear to be extended. Accordingly, decrease in motion resolution can be avoided.

In the case of the control line diagram shown in FIG. 5, if the charge accumulation duration SS set to obtain an appropriate exposure satisfies 1/500 (seconds)>SS>1/2000 (seconds), the apparent charge accumulation duration can be deemed to be 1/500 (seconds).

As described above, according to the first embodiment, even when the charge accumulation duration set so as to obtain an appropriate exposure is short and there is a concern that the motion resolution might decrease, the desired exposure level can be obtained in a charge accumulation duration that is seemingly longer than the set charge accumulation duration. Accordingly, it is possible to prevent motion resolution from decreasing.

Also, the first embodiment was described taking an example in which the charge accumulation start timing and read-out start timing of the photoelectric conversion units A, B, C and D are shifted when the charge accumulation duration SS is less than 1/500 (seconds), but the present invention is not limited thereto. It is also possible to use a configuration in which the charge accumulation start timing and read-out start timing of the photoelectric conversion units A, B, C and D are shifted whenever the charge accumulation duration SS is, for example, less than 1/60 (seconds) or other predetermined period of time shorter than 1/60.

Second Embodiment

Figure 6:
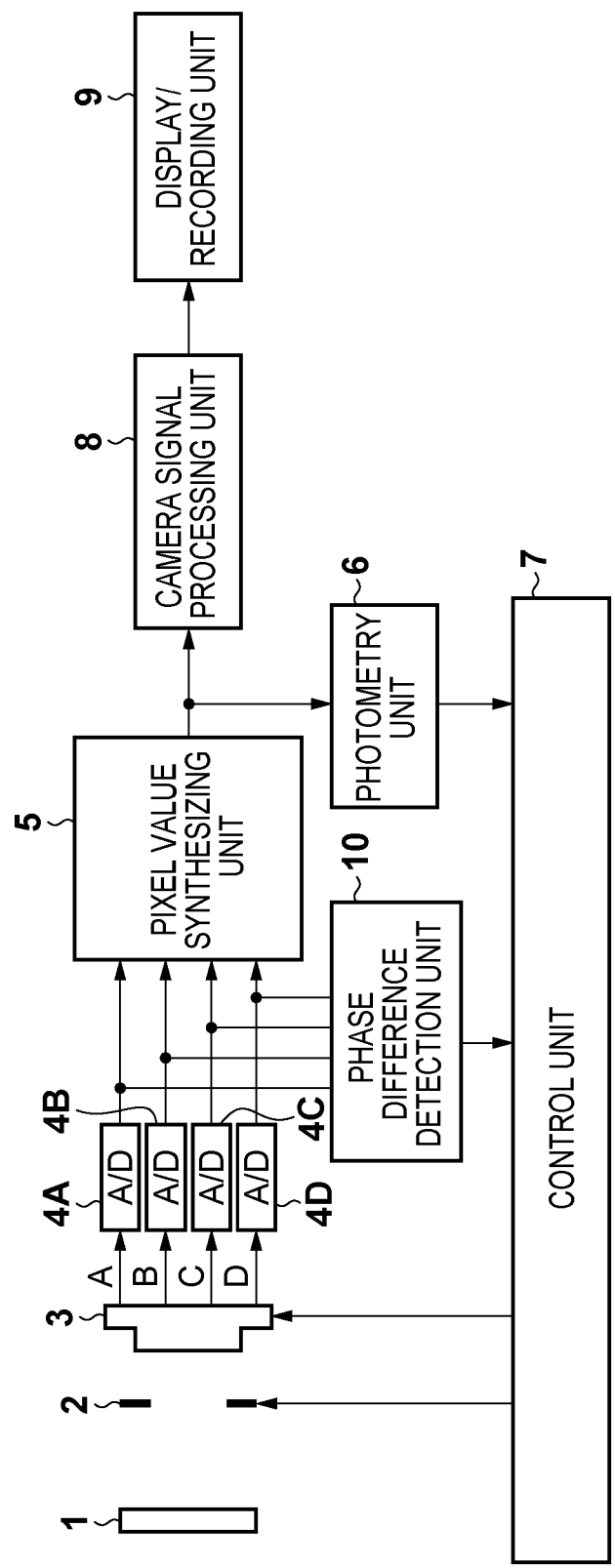
FIG. 6 is a block diagram showing a schematic configuration of an image capturing apparatus according to a second embodiment of the present invention.

FIG. 6 is a block diagram showing a schematic configuration of an image capturing apparatus according to a second embodiment of the present invention. The difference from the image capturing apparatus of the first embodiment described with reference to FIG. 1 is that, in the second embodiment, a phase difference detection unit 10 has been added, and image capturing processing and focus detection processing using the phase difference detection unit 10 are performed simultaneously. The constituent elements other than the above and control of charge accumulation of a plurality of photoelectric conversion unit of each pixel of the image sensor 3 are the same as those described with reference to FIGS. 1 to 5, and thus description thereof is not given here.

An overview of operations of an image capturing apparatus according to the second embodiment of the present invention will be described next. Light that has entered the image sensor 3 via the imaging lens 1 and the diaphragm 2 is converted to electric charges by the photoelectric conversion units A, B, C and D in the image sensor 3, and charge accumulation and read-out are performed by each of the photoelectric conversion units. At this time, in the image sensor 3, driving of each of the photoelectric conversion units A, B, C and D of each pixel is individually controlled in the manner described above according to the subject luminance such that an appropriate exposure can be obtained based on the control signal from the control unit 7.

The analog signals output from the photoelectric conversion units A, B, C and D of each pixel of the image sensor 3 are converted to digital signals by the A/D converters 4A to 4D. Then, the digital signals output from the A/D converters 4A to 4D are input into the pixel value synthesizing unit 5 and the phase difference detection unit 10, respectively.

The processing performed after the processing of the pixel value synthesizing unit 5 is the same as that of the first embodiment described above, and thus description thereof is omitted here.

Meanwhile, the phase difference detection unit 10 performs phase difference detection processing for adjusting focus based on the digital signals output from the A/D converters 4A to 4D. The phase difference detection processing will now be described with reference to FIG. 7 and FIGS. 8A to 8C.

Figure 7:
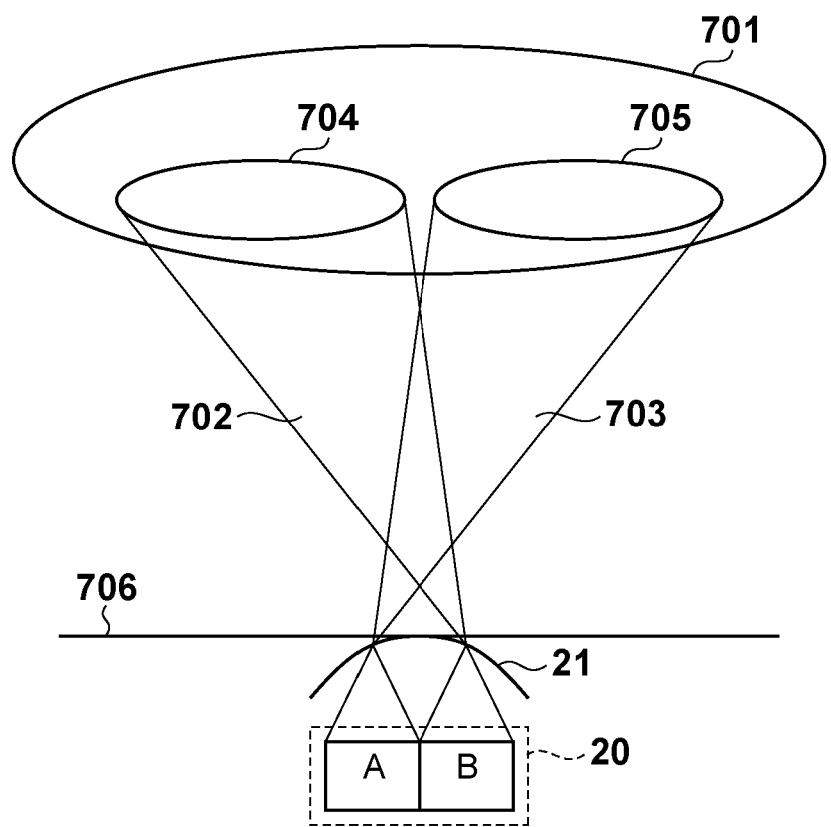
FIG. 7 is a cross sectional view of an image sensor and a schematic diagram showing an exit pupil of an optical system according to the second embodiment.

FIG. 7 is a schematic cross sectional view taken along the line A-A' shown in FIG. 2. Reference numeral 701 indicates an exit pupil of the imaging lens 1 as viewed from the image side. Reference numerals 704 and 705 respectively indicate exit pupils of photoelectric conversion units A and B projected to the exit pupil position by the microlens 21. The photoelectric conversion unit A is designed such that a light beam 703 that has passed through the exit pupil 705 enters the photoelectric conversion unit A, and the photoelectric conversion unit B is designed such that a light beam 702 that has passed through the exit pupil 704 enters the photoelectric conversion unit B. Other pixel portions constituting the image sensor 3 are also similarly designed. In the photoelectric conversion unit A of a single pixel, an image appearing in the region 704 that is located on the front left side of the exit pupil 701 of the imaging lens 1 is obtained. Likewise, in the photoelectric conversion unit B of the single pixel, an image appearing in the region 705 that is located on the front right side of the exit pupil 701 of the imaging lens 1 is obtained.

FIG. 7 is described using only the photoelectric conversion units A and B, but photoelectric conversion units C and D are also provided on the front side in FIG. 7. A light beam that has passed through a region (not shown) that is located on the back left side of the exit pupil 701 of the imaging lens 1 enters the photoelectric conversion unit D, and a light beam that has passed through a region that is located on the back right side enters the photoelectric conversion unit C.

If it is assumed here that an image obtained based on the light beam 702 is defined as image A, and an image obtained on the image sensor 3 based on the light beam 703 is defined as image B, the image A and the image B can be regarded as images based on light beams that have passed through different pupil regions of the imaging lens 1 (imaging optical system).

If the imaging lens 1 is in focus on a subject, two images corresponding to different pupil regions are highly correlated. If, on the other hand, the imaging lens 1 is out of focus, two images corresponding to different pupil regions are less correlated. Accordingly, in the second embodiment, focus adjustment is performed based on the correlation between two images obtained from light beams that have passed through different pupil regions.

For example, the phase difference detection unit 10 stores the image A corresponding to the photoelectric conversion unit A and the image B corresponding to the photoelectric conversion unit B, which were output from the output of the A/D converters 4A and 4B, in an internal memory (not shown), and performs a correlation operation between the image A and the image B so as to obtain the image interval and positional relationship between the two images.

Figure 8A:
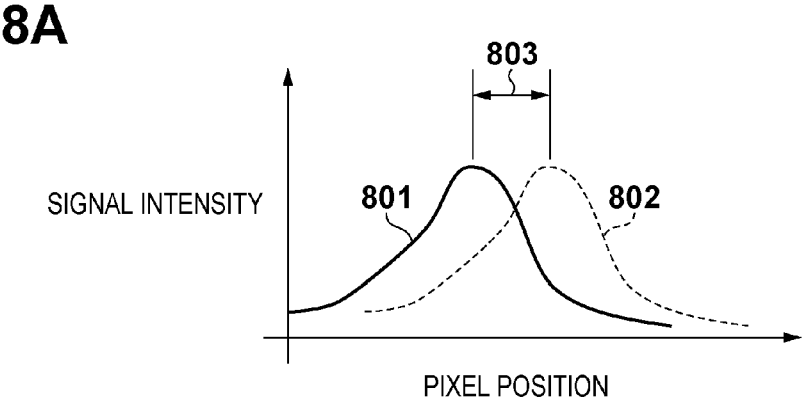
FIGS. 8A to 8C are diagrams showing a relationship between image signal and focus state according to the second embodiment.
Figure 8B:
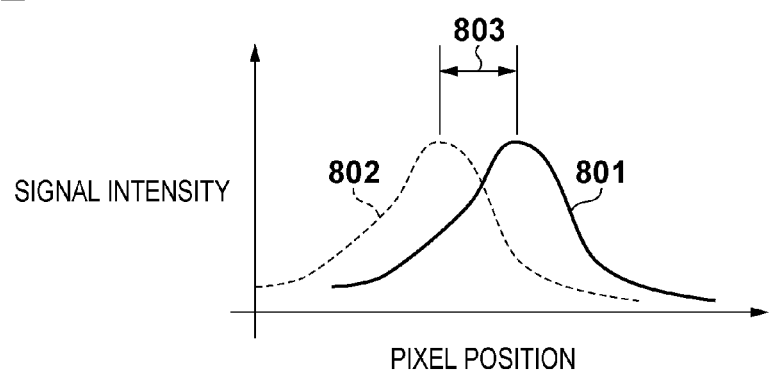
Figure 8C:
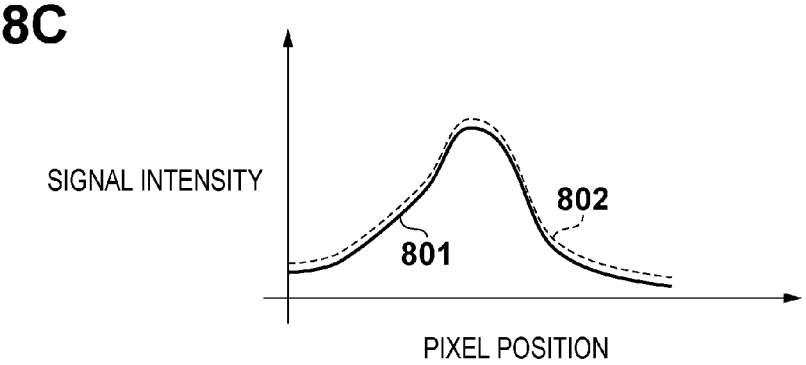
Figure 9:
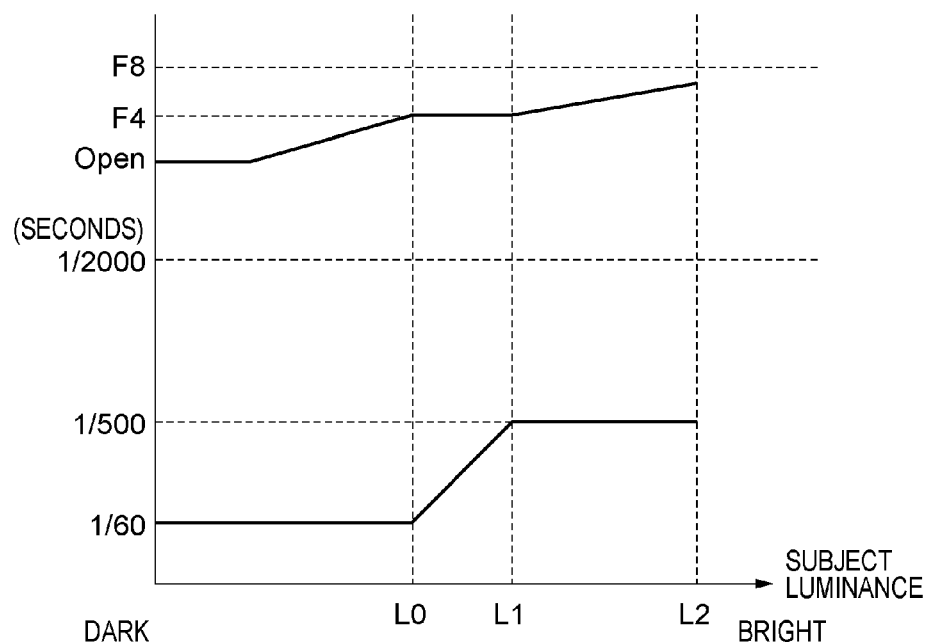
FIG. 9 is a programmed locus illustrating conventional exposure control.
Figure 10:
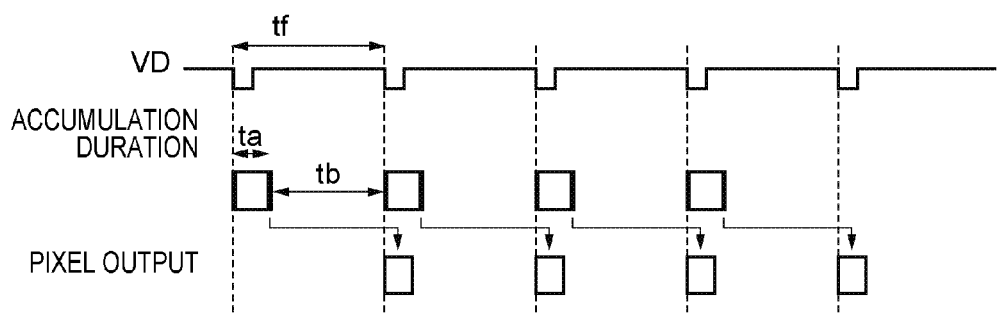
FIG. 10 is a timing chart showing problems of conventional exposure control using a high-speed shutter.

The relationship between the image A and the image B is, for example, as shown in FIGS. 8A to 8C, in which reference numeral 802 indicates the image A and reference numeral 801 indicates the image B. FIG. 8A shows front focus state, FIG. 8B shows rear focus state, and FIG. 8C shows in-focus state. Detection is performed, based on the positional relationship of pixels between the image A and the image B and the image interval 803 between the image A and the image B, so as to determine whether the imaging lens 1 is currently in in-focus state or out-of-focus state, and also determine how much the front focus or rear focus is if the lens is in out-of-focus state.

With the image capturing apparatus of the second embodiment, there are cases where the driving timings of the photoelectric conversion units A, B, C and D of each pixel of the image sensor 3 are shifted when the subject luminance is high. Accordingly, when the phase difference detection unit 10 performs a correlation operation between two images obtained from light beams that have passed through different pupil regions, the correlation operation is performed considering the differences between the driving timings of the photoelectric conversion units. For example, if the difference between two images is smaller than a predetermined threshold value TH, the phase difference detection unit 10 judges that these images are correlated. Then, the control unit 7 performs control so as to increase the threshold value TH for correlation operation used by the phase difference detection unit 10 in proportion to the amount of shift (Δt seconds) between driving timings of the photoelectric conversion units A, B, C and D.

In the foregoing, a case was described in which phase difference detection was performed by using two horizontally adjacent photoelectric conversion units A and B among a plurality of photoelectric conversion units constituting a single pixel, but the photoelectric conversion units A, B, C and D can be used in any combination other than that.

As described above, according to the second embodiment, similar effects as those of the first embodiment can be obtained, and at the same time focus adjustment using phase difference detection can be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-147738, filed on Jul. 1, 2011 which is hereby incorporated by reference herein in its entirety.

What is claimed is:

1. An image capturing apparatus comprising:
an image sensor that includes a plurality of pixels each having a plurality of photoelectric conversion units and a microlens and that is capable of capturing a subject and periodically outputting image signals individually from the plurality of photoelectric conversion units;
a control unit that performs control such that, within the period in which the image sensor outputs an image signal, charge accumulation durations of the plurality of photoelectric conversion units of each pixel of the image sensor are shifted with respect to each other;
a synthesizing unit that sums up, for each pixel, the image signals individually output from the plurality of photoelectric conversion units; and
a determination unit that determines a charge accumulation duration in the image sensor based on a subject luminance,
wherein when the charge accumulation duration determined by the determination unit is shorter than a preset charge accumulation duration, the control unit causes the charge accumulation durations of the plurality of photoelectric conversion units of each pixel of the image sensor to be shifted with respect to each other within the period in which the image sensor outputs an image signal.

2. The image capturing apparatus according to claim 1, wherein the control unit performs control so as to cause the charge accumulation durations to be shifted with respect to each other by causing charge accumulation start timing and charge read-out timing of each of the plurality of photoelectric conversion units to be shifted with respect to each other.

3. The image capturing apparatus according to claim 1, wherein when the charge accumulation duration determined by the determination unit is not shorter than the preset charge accumulation duration, the control unit performs control so as to cause the charge accumulation durations of the plurality of photoelectric conversion units of each pixel of the image sensor to be the same within the period.

4. The image capturing apparatus according to claim 1, wherein the preset charge accumulation duration is a charge accumulation duration that is an acceptable limit for motion resolution decrease within the period.

5. An image capturing apparatus comprising:
an image sensor that includes a plurality of pixels each having a plurality of photoelectric conversion units and a microlens and that is capable of capturing a subject and periodically outputting image signals individually from the plurality of photoelectric conversion units;
a control unit that performs control such that, within the period in which the image sensor outputs an image signal, charge accumulation durations of the plurality of photoelectric conversion units of each pixel of the image sensor are shifted with respect to each other;
a synthesizing unit that sums up, for each pixel, the image signals individually output from the plurality of photoelectric conversion units;
a phase difference detection unit that determines a phase difference between an image signal obtained from one of the plurality of photoelectric conversion units and an image signal obtained from another one of the plurality of photoelectric conversion units; and
a judging unit that judges that an in-focus state has been achieved if the phase difference determined by the phase difference detection unit is smaller than a predetermined threshold value, and wherein the control unit sets the predetermined threshold value and performs control so as to increase the predetermined threshold value as an amount of shift of the charge accumulation duration shifted by the control unit increases.

6. A method for controlling an image capturing apparatus including an image sensor that includes a plurality of pixels each having a plurality of photoelectric conversion units and a microlens and that is capable of capturing a subject and periodically outputting image signals individually from the plurality of photoelectric conversion units, the method comprising:
with a control unit, performing control such that, within the period in which the image sensor outputs an image signal, charge accumulation durations of the plurality of photoelectric conversion units of each pixel of the image sensor are shifted with respect to each other;
with a synthesizing unit, summing up, for each pixel, the image signals individually output from the plurality of photoelectric conversion units; and
with a determination unit, determining a charge accumulation duration in the image sensor based on a subject luminance,
wherein when the charge accumulation duration determined in the determining step is shorter than a preset charge accumulation duration, in the control step, the charge accumulation durations of the plurality of photoelectric conversion units of each pixel of the image sensor are controlled to be shifted with respect to each other within the period in which the image sensor outputs an image signal.

7. A method for controlling an image capturing apparatus including an image sensor that includes a plurality of pixels each having a plurality of photoelectric conversion units and a microlens and that is capable of capturing a subject and periodically outputting image signals individually from the plurality of photoelectric conversion units, the method comprising:
with a control unit, performing control such that, within the period in which the image sensor outputs an image signal, charge accumulation durations of the plurality of photoelectric conversion units of each pixel of the image sensor are shifted with respect to each other;

with a synthesizing unit, summing up, for each pixel, the image signals individually output from the plurality of photoelectric conversion units;

with a phase difference detection unit, determining a phase difference between an image signal obtained from one of the plurality of photoelectric conversion units and an image signal obtained from another one of the plurality of photoelectric conversion units; and with a judging unit, judging that an in-focus state has been achieved if the phase difference determined by the phase difference detection unit is smaller than a predetermined threshold value, and wherein the control unit sets the predetermined threshold value and performs control so as to increase the predetermined threshold value as an amount of shift of the charge accumulation duration shifted by the control unit increases.

8. The image capturing apparatus according to claim 1, wherein an amount of shift of charge accumulation shifted by the control unit is based on charge accumulation duration that is an acceptable limit for motion resolution decrease within the period.

* * * * *